Figure 1:
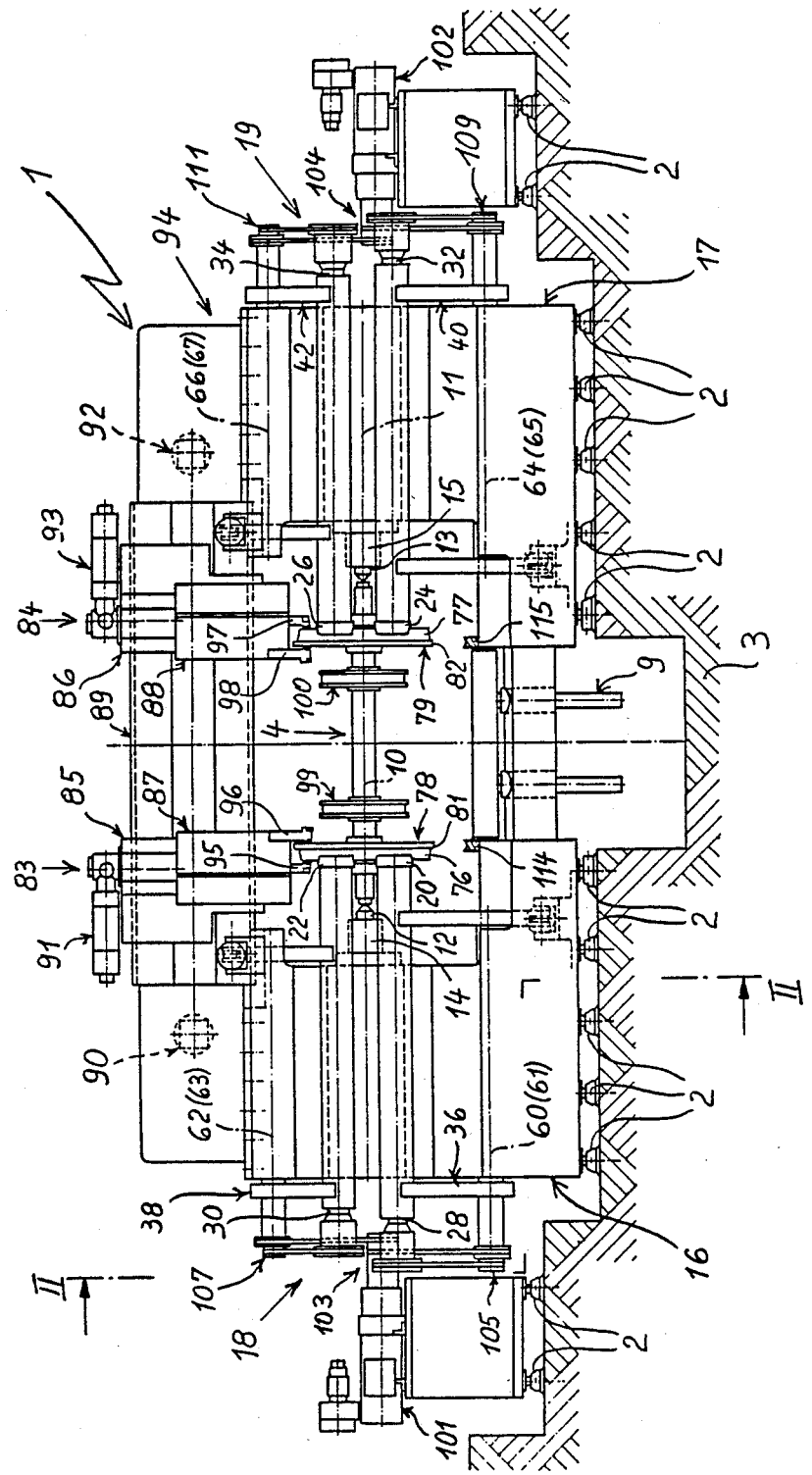

United States Patent [19]

Bathelt et al.

[11] Patent Number: 4,914,991

[45] Date of Patent: Apr. 10, 1990

[54] LATHE FOR MACHINING THE BRAKE DISKS IN A SET OF WHEELS DISMANTLED FROM A RAILROAD VEHICLE

[75] Inventors: Kurt Bathelt; Wolfgang Beck, both of Dortmund; Dirk Brinkmann, Lünen-Niederaden; Wilfried Reske, Schwerte, all of Fed. Rep. of Germany

[73] Assignee: Hoesch Maschinenfabrik Deutschland AG, Dortmund, Fed. Rep. of Germany

[21] Appl. No.: 321,520

[22] Filed: Mar. 9, 1989

[30] Foreign Application Priority Data

Mar. 18, 1988 [DE] Fed. Rep. of Germany ....... 3809250

[51] Int. Cl.$^4$ ........................... B23B 5/02; B23B 5/28
[52] U.S. Cl. ...................................... 82/104; 82/112; 82/165
[58] Field of Search ................ 82/101, 104, 105, 112, 82/117, 124, 164, 165

[56] References Cited

U.S. PATENT DOCUMENTS

| 3,906,821 | 9/1975 | Schultz | 82/101 |
| 4,083,271 | 4/1978 | Miller et al. | 82/104 |
| 4,541,316 | 9/1985 | Fuminier | 82/101 |
| 4,674,370 | 6/1987 | Gutohrlein et al. | 82/104 |
| 4,693,149 | 9/1987 | Sireix | 82/101 |
| 4,825,737 | 5/1989 | Heimann et al. | 82/105 |

FOREIGN PATENT DOCUMENTS 0181456  5/1986  European Pat. Off. ............. 82/104

Primary Examiner—William Terrell
Attorney, Agent, or Firm—Max Fogiel

[57] ABSTRACT

For machining the tread circumferences and brake disks of sets of wheels dismounted from railroad vehicles a lathe is proposed wherein each wheel in the set is driven by four friction rollers that can be forced against the tread and are positioned essentially diametrically opposite one another in pairs.

7 Claims, 5 Drawing Sheets

LATHE FOR MACHINING THE BRAKE DISKS IN A SET OF WHEELS DISMANTLED FROM A RAILROAD VEHICLE

The invention concerns a lathe for machining the brake disks in a set of wheels dismounted from a railroad vehicle and secured between lathe centers, with two tail stocks, a wheel-set raising-and-lowering mechanism, at least one swivel head and one cutting tool, and several driven friction rollers that pivot and engage the two wheels in the set.

A lathe of this type is known from German OS 2 424 305.

Each wheel in the set is driven in a lathe of this type by two friction rollers, one engaging the tread and the other the inner lateral surface of the tire circumference.

This lathe is not appropriate for recontouring the tire circumferences in one step because the friction roller can transmit only low peripheral forces to the wheels.

The object of the present invention is to improve a lathe of the aforesaid type to the extent that it allows the transmission of powerful peripheral forces to the wheels and accordingly makes it possible to recontour the tire circumferences in one step.

This object is attained in accordance with the invention in that each wheel in the set is driven by four friction rollers that can be forced against the tread and are positioned essentially diametrically opposite one another in pairs. Each friction roller pivots separately around an axis that parallels the axis of the lathe.

Each friction roller is preferably secured to one driveshaft.

Each driveshaft rotates in a rocker.

In accordance with another characteristic of the invention, the driveshafts for the friction rollers that can be forced against one tread are coupled to a distributor that is driven by a back-geared motor.

Each distributor contains four double-belt drive mechanisms.

Figure 2:
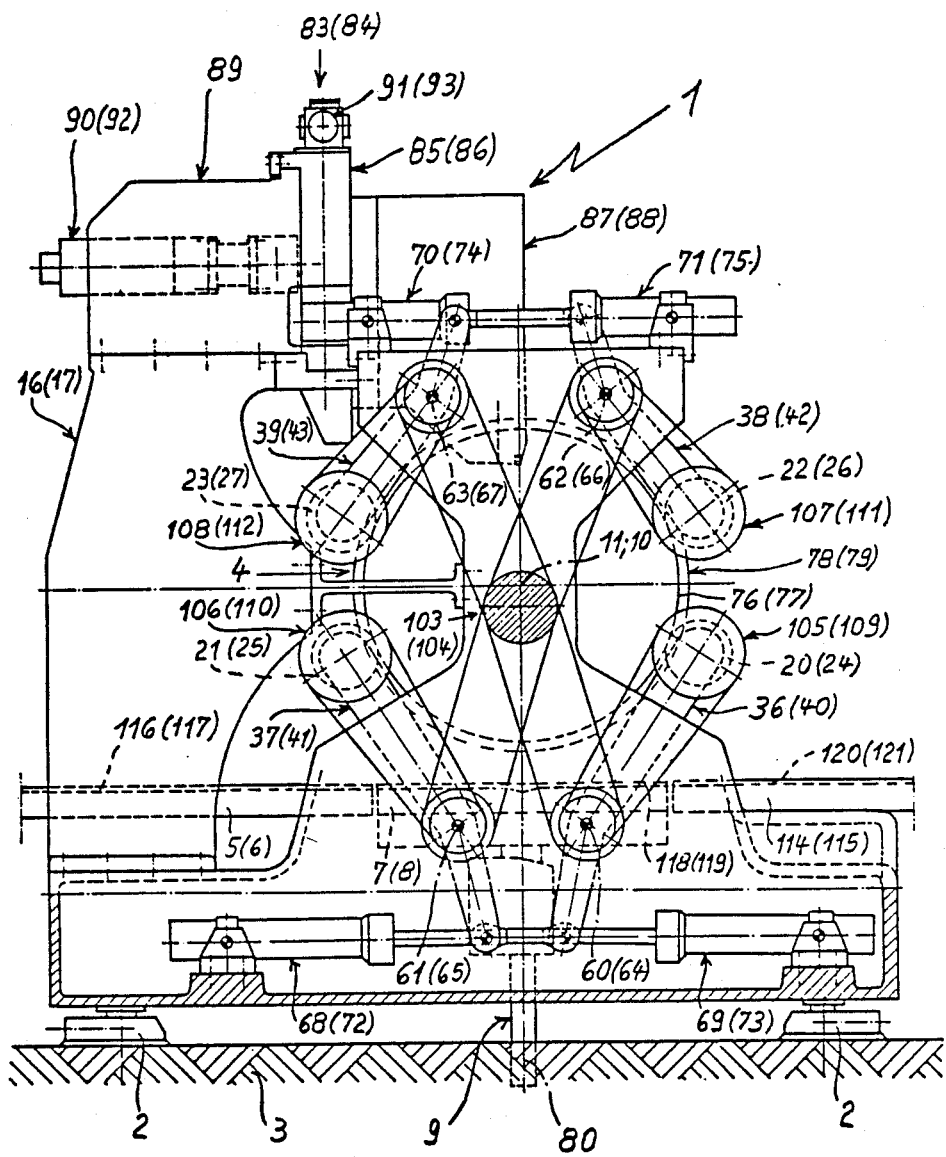
Figure 3:
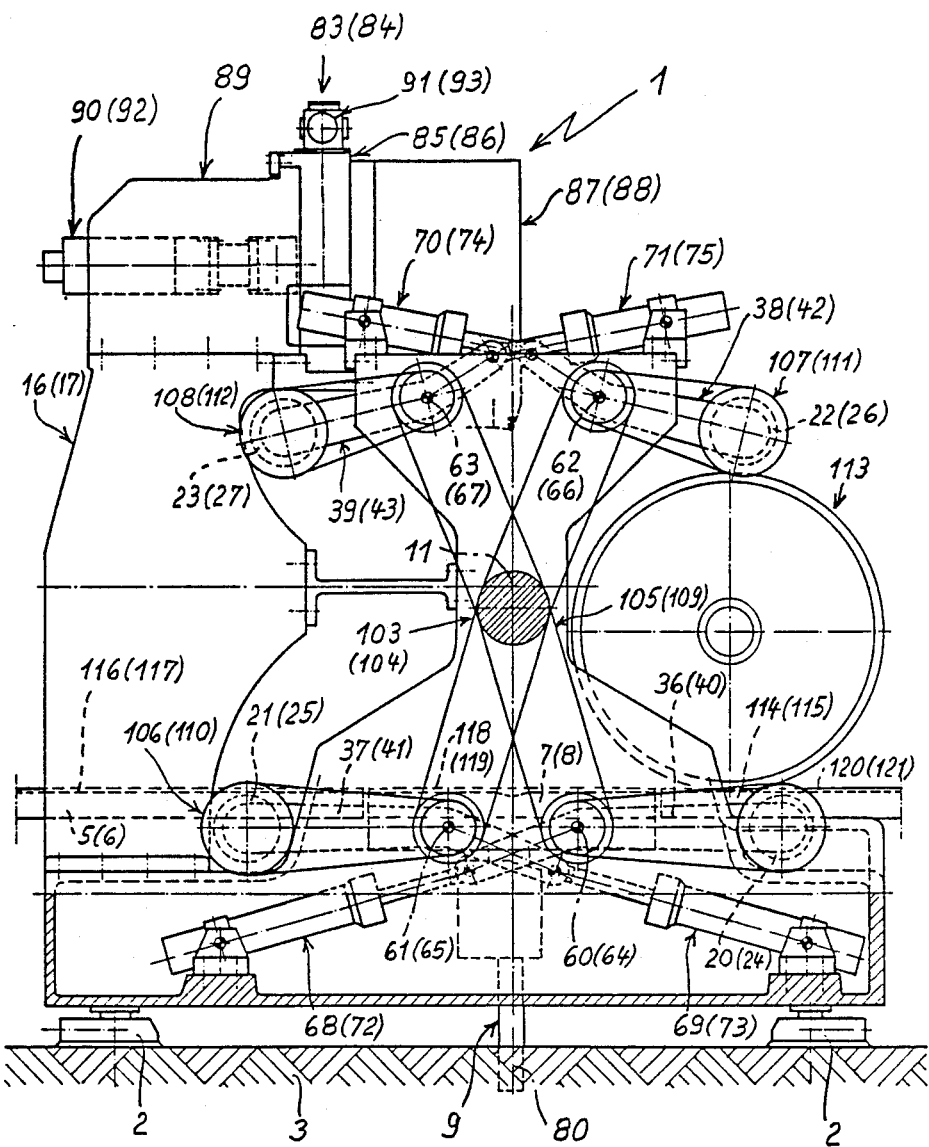
Figure 4:
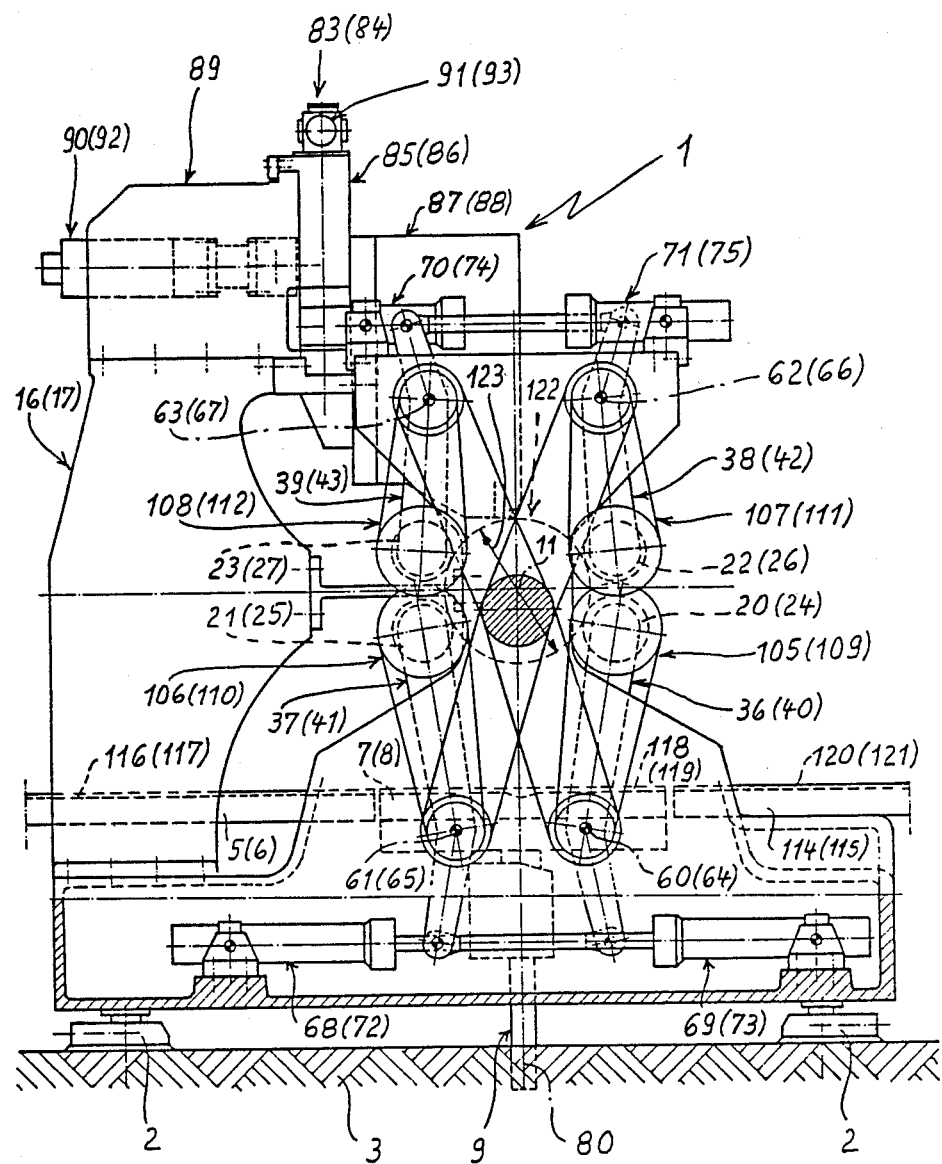
Figure 5:
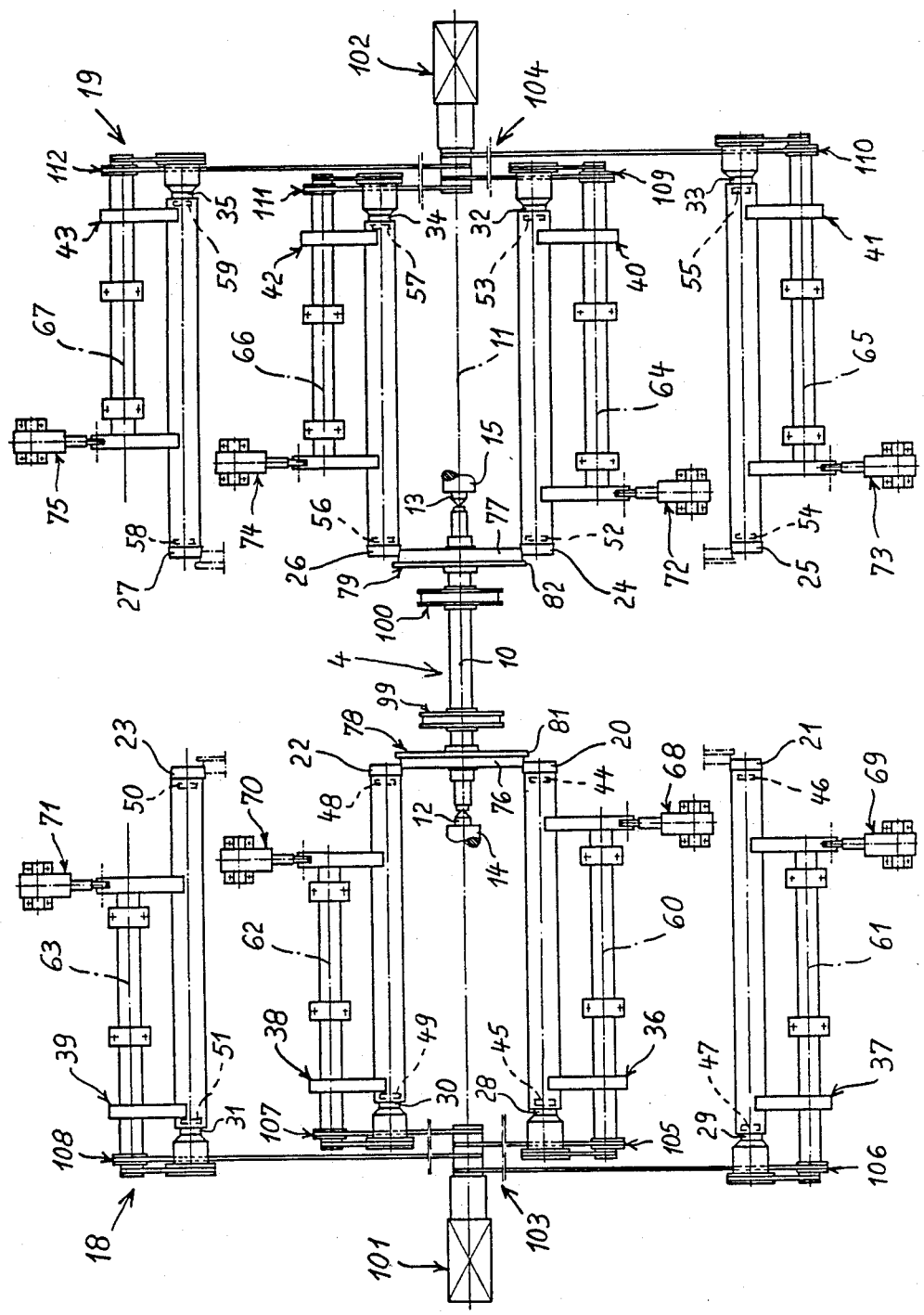

One embodiment of the invention will now be described in greater detail with reference to the drawing, wherein FIG. 1 is both a view of a lathe with two friction-roller drive mechanisms and a set of wheels tensioned between two centers and a section through two roll-out rails and a base, FIG. 2 is a larger-scale section along the line II—II in FIG. 1, FIG. 3 is a section similar to FIG. 2 with the friction rollers pivoted out and the finished set of wheels resting on the roll-out rails, FIG. 4 is a section similar to FIG. 2 with the friction rollers forced against the treads of the wheels in a set with a short tread diameter, and FIG. 5 is a view of the set of wheels secured between two centers as in FIG. 1 with the friction-roller drive mechanism illustrated in a developed view.

A lathe 1 rests on several supports 2 that can be moved up and down and from side to side and are mounted on a base 3.

A set 4 of wheels of wheels that are to be machined is initially rolled by way of roll-in tracks 5 and 6 onto the tracks 7 and 8 of a raising-and-lowering mechanism 9. The raising-and-lowering mechanism then raises set 4 into a position where the axis 10 of the set is aligned with the axis 11 of rotation of lathe 1. The set is then tensioned between two centers 12 and 13.

Each center 12 and 13 is inserted in a sleeve 14 and 15 that slides back and forth along the axis 11 of rotation in a tail stock 16 and 17.

Lathe 1 has two friction-roller drive mechanisms 18 and 19, each with four friction rollers 20, 21, 22, 23, 24, 25, 26, and 27.

Each friction roller 20 through 27 is secured to a driveshaft 28, 29, 30, 31, 32, 33, 34, and 35 that is secured in pivot bearings 44, 45, 46, 47, 48, 49, 50, 51, 52, 53, 54, 55, 56, 57, 58, and 59 in a rocker 36, 37, 38, 39, 40, 41, 42, and 43.

Each rocker 36 through 43 pivots separately around an axis 60, 61, 62, 63, 64, 65, 66, and 67 that parallels axis 11 of rotation. The back-and-forth motion of each rocker 36 through 43 actuates and advance mechanism 68, 69, 70, 71, 72, 73, 74, and 75.

Once a set 4 of wheels has been secured in the lathe, four friction rollers 20 through 23 and 24 through 27 in each drive mechanism 18 and 19 is forced against running surface 76, 77 one wheel 78 and 79 (FIGS. 1 & 2). Friction rollers 20 through 27 are essentially diametrically opposite one another in pairs. Friction rollers 20 through 27 are also symmetrical to the vertical planes 80 that extend through axis 11 of rotation (FIG. 2).

Lathe 1 has two swivel heads 83 and 84 for recontouring the circumferences 81 and 82 of the tires on the wheels in set 4.

Each swivel head 83 and 84 has a plane carriage 85 and 86 and a longitudinal carriage 87 and 88.

The plane carriages 85 and 86 in swivel heads 83 and 84 slide back and forth on a lathe bed 89 parallel with axis 11 of rotation.

Each swivel head 83 and 84 is driven by two motors 90 and 91 and 92 and 93, with motors 90 and 91 generating the plane advance and motors 92 and 93 the longitudinal advance. The two tail stocks 16 and 17 and lathe bed 89 constitute a gate-shaped assembly 94.

Both tire circumferences 81 and 82 are recontoured simultaneously by means of tools 95, 96, 97, and 98 in a plane 80 that extends through axis 11 of rotation.

The two brake disks 99 and 100 in set 4 are machined with separate tools (not illustrated).

The rotation of each four friction rollers 20 through 23 and 24 through 27 forced against one tread 76 and 77 is initiated by a back-geared motor 101 and 102.

Each back-geared motor 101 and 102 drives four driveshafts 28 through 31 and 32 through 35 by way of a distributor 103 and 104.

Associated with each distributor 103 and 104 are four doublebelt drive mechanisms 105, 106, 107, and 108 and 109, 110, 111, and 112. Each double-belt drive mechanism 105 through 112 is coupled to one driveshaft 28 through 35.

As soon as the set has been machined, swivel heads 83 and 84 are returned one after the other to their starting positions, friction rollers 20 through 27 are pivoted out, and the finished set 113 is removed from the lathe, and lowered and rolled from the tracks 7 and 8 on raising-and-lowering mechanism 9 to roll-out rails 114 and 115 (FIG. 3).

Roll-in tracks 5 and 6, tracks 7 and 8, and roll-out rails 114 and 115 are each provided with a positioning groove 116, 117, 118, 119, 120, and 121.

As will be evident from FIG. 5, lathe 1 can also be employed for machining a set 122 of wheels with a very short tread diameter 123.

We claim:

1. A lathe for machining brake disks in a set of wheels removed from a railroad vehicle, comprising: two tail stocks in said lathe and having lathe centers for securing a set of wheels between said lathe centers; said lathe centers defining an axis therebetween, and said set having an axis; wheel-set raising and lowering means for raising and lowering said axis of said set with respect to said axis between said lathe centers; at least one swivel head and one cutting tool for recontouring said brake disks, said set having two wheels; a plurality of driven friction rollers pivoting and engaging the two wheels in said set; each wheel in said set having a tread; each wheel in said set being driven by four friction rollers; means for forcing said four friction rollers against said tread, said four friction rollers being positioned substantially diametrically opposite one another in pairs for transmitting peripheral forces to said wheels sufficient to recontour said brake disks in one step.

2. A lathe as defined in claim 1, including means for pivoting each friction roller separately about an axis parallel to said axis defined by said lathe centers.

3. A lathe as defined in claim 1, including a drive shaft secured to each friction roller.

4. A lathe as defined in claim 3, including a rocker, each drive shaft rotating in said rocker.

5. A lathe as defined in claim 3, including distributor means and a back-geared motor for driving said distributor means; said drive shafts secured to said friction rollers being coupled to said distributor means.

6. A lathe as defined in claim 5, including four double-belt drives in said distributor means.

7. A lathe for machining brake disks in a set of wheels removed from a railroad vehicle, comprising: two tail stocks in said lathe and having lathe centers for securing a set of wheels between said lathe centers; said lathe centers defining an axis therebetween, and said set having an axis; wheel-set raising and lowering means for raising and lowering said axis of said set with respect to said axis between said lathe centers; at least one swivel head and one cutting tool for recontouring said brake disks, said set having two wheels; a plurality of driven friction rollers pivoting and engaging the two wheels in said set; each wheel in said set having a tread; each wheel in said set being driven by four friction rollers; means for forcing said four friction rollers against said tread, said four friction rollers being positioned substantially diametrically opposite one another in pairs for transmitting peripheral forces to said wheels sufficient to recontour said brake disks in one step; means for pivoting each friction roller separately about an axis parallel to said axis defined by said lathe centers; a drive shaft secured to each friction roller; a rocker, each drive shaft rotating in said rocker; distributor means and a back-geared motor for driving said distributor means; said drive shafts secured to said friction rollers being coupled to said distributor means; and four double-belt drives in said distributor means.

* * * * *